Fig. 5

May 20, 1947. W. L. RASCHKE 2,420,796
HELICOPTER WITH LATERALLY DISPOSED LIFT ROTORS
Filed Dec. 3, 1945 9 Sheets-Sheet 7

Fig. 13

WILLIAM L. RASCHKE
INVENTOR.

BY Herbert J. Brown
Attorney

Patented May 20, 1947

2,420,796

UNITED STATES PATENT OFFICE 2,420,796

HELICOPTER WITH LATERALLY DISPOSED LIFT ROTORS

William L. Raschke, Fort Worth, Tex.

Application December 3, 1945, Serial No. 632,395

5 Claims. (Cl. 244—17)

This invention relates to rotary winged aircraft and has particular reference to a control system for helicopters and the like.

The primary object of the present invention is to provide a control which is simple to operate, and one which corresponds with conventional controls in airplanes.

Another object of the invention is to provide, in addition to the foregoing object, a control for helicopters and the like which has "feel" similar to control reactions or stick forces in airplane controls.

A particular object of the invention is to provide a control system for helicopters and the like which eliminates constant effort on the part of the operator by means of automatic stabilizing mechanism.

Another object of the invention is to provide a helicopter and control system therefor which is more efficient, both aerodynamically and mechanically, than others now in use.

A further object is to provide a control and rotor construction for adaption to a helicopter body or fuselage capable of being converted and used as a road vehicle.

These and other objects will become apparent from the following description of the accompanying drawings, wherein.

The form of the invention shown is embodied in a helicopter having a fuselage or body 1, including wheels 2 and other mechanism (not shown) for converting the helicopter into a road vehicle, twin rotor assemblies 3, one on either side of the said fuselage, and booms 4 for supporting the said rotor assemblies.

Within the fuselage 1, there is a mounted engine 5 for turning the rotors 3 in opposite directions. The rotor 3 on the right hand, looking down and forward, is driven counterclockwise, whereas the other rotor is driven clockwise. The rotor rotation is accomplished by means of a flywheel 6 driven by the engine 5 which, in turn, is connected with a vertical shaft 7 operatively connected with the flywheel shaft 8 by means of a lower beveled gear unit 9. The upper end of the vertical shaft 7 is similarly provided with a beveled gear unit 10, the shaft 11 of which is connected with a freewheeling unit 12. The latter is connected, by means of a flexible coupling 13, with a gear box 14. Opposing shafts 15 extend laterally from the gear box 14, and both rotate in the same direction for ultimately turning the rotors 3 in opposite directions.

Figure 5:
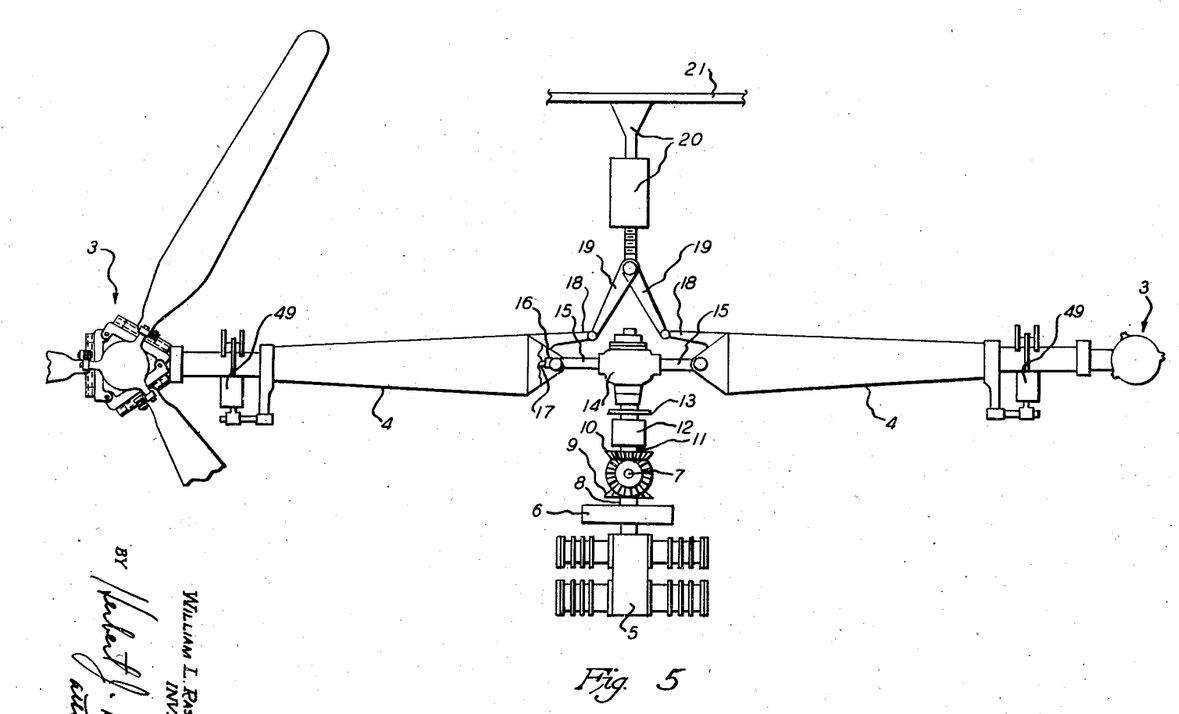
Figure 5 is a plan view of the rotor supporting arms or booms and showing the engine for driving the rotors in its relative position, together with the mechanism for hingedly moving the said arms or booms forward and aft.

The booms 4 are hinged to the fuselage 1, above and below the ends of the opposing shafts 15. Universal joints 16 are secured to the ends of the last named shafts 15 for connection with other shafts 17 rotatably mounted within the said booms 4. Fixed and inwardly extending levers 18 are attached to the booms 4 and are pivotally secured to the ends of separate cranks 19 which are pivoted to each other at their remaining ends. The last referred to pivot is connected with one end of a linear actuator 20, hereinafter referred to as the balance actuator, which is, in turn, secured to the fuselage structure 21.

Figures 6, 7, 8:
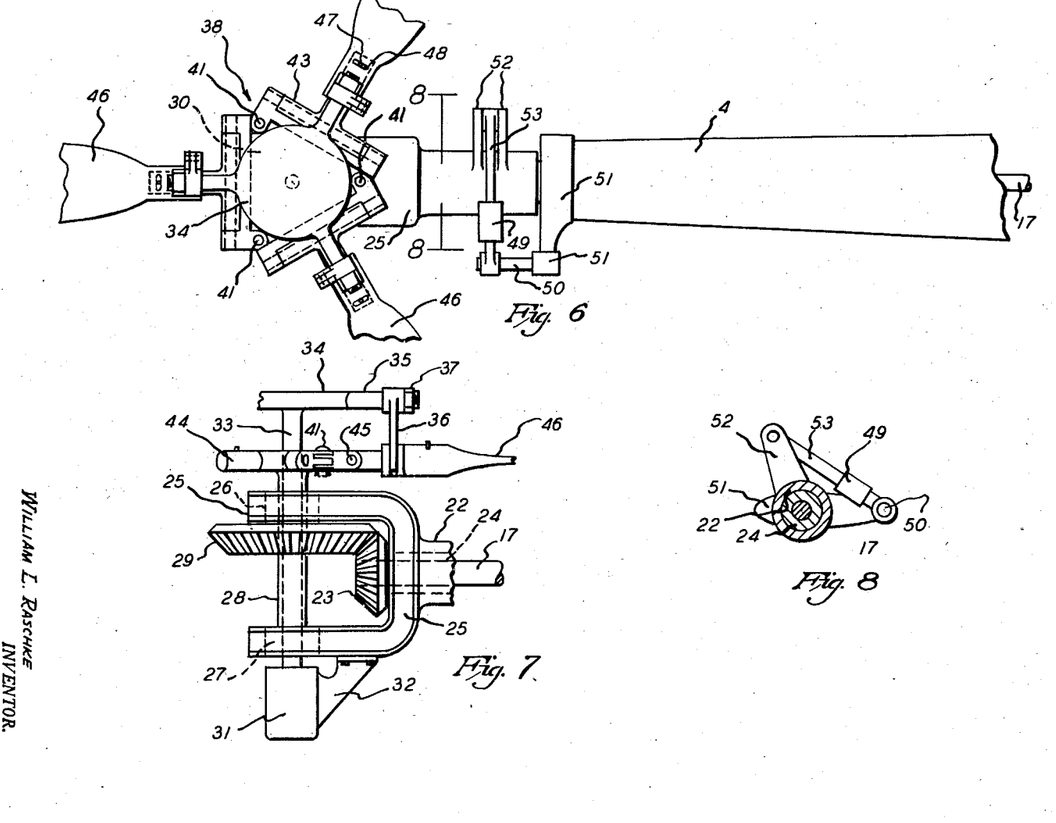
Figure 6 is a broken plan view of the hub of one of the rotors, together with the supporting elements at the outer end of one of the booms, and particularly showing the arrangement for hingedly supporting the rotor blades, as well as means for tilting the plane of the rotor.
Figure 7 is broken side elevational view of the mechanism shown in Figure 6, and additionally showing the provision for changing the pitch of the rotor blades.
Figure 8 is a sectional view taken on lines 8—8 of Figure 6 and showing a linear actuator mounted on one of the rotor supporting booms for changing the tilt of the supported rotor.

The ends of the shafts 17 extend beyond the ends of the booms 4 where they rotatably pass through rotor supporting housings 22 where they rigidly support beveled gears 23. The housings 22 retain bearings 24 in which the shafts 17 rotate. The outer ends of the housings 22 have integral C shaped bearing supports 25 for retaining upper and lower bearings 26 and 27, respectively. A torque tube 28 is journaled in the upper and lower bearings 26 and 27, and which tube 28 supports another beveled gear 29.

A triangular plate 30, indicated by dotted lines in Figure 6, is secured to the upper end of the torque tube 28, and which plate is rotated by means of the first referred to beveled gear 23, meshing with the second referred to gear 29. It is to be understood that the rotor mechanism is identical for each of the rotors 3 with the exception of certain blade pitch actuators, to be described, which are oppositely arranged on the separate said rotor assemblies.

Continuing the description of one of the rotors 3, there is a reversible rotor driven linear actuator 31 mounted, by means of a bracket 32, on the under side of the bearing support 25, which actuator vertically moves a rod 33 up and down through the torque tube 28. A disk or other plate 34 is welded or otherwise secured to the upper end of the rod 33, and has laterally extending stub shafts 35 upon which links 36 are journaled. The links 36 are previously referred to as the parts oppositely arranged in the separate rotors 3. The links 36 are retained against centrifugal force by nuts 37, or other retaining means, secured to the ends of the stub shafts 35.

Figures 17, 18, 19:
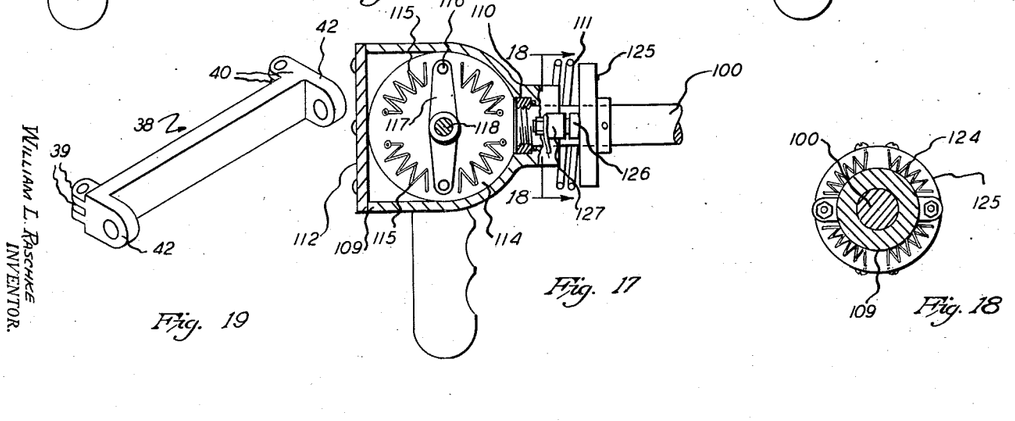
Figure 17 is a lateral sectional view taken on lines 17—17 of Figure 16 and showing the switch and rheostat arrangement for simultaneously controlling the tilt of the rotors on the one hand, and simultaneous pitch control on the other hand.
Figure 18 is a sectional view taken on lines 18—18 of Figure 17 and showing the switch and rheostat arrangement for inversely controlling the tilt of the rotors.
Figure 19 is perspective view of one of the rotor hinges.

Along each side of the triangular plate 30, there is a blade hinge 38, as shown in detail in Figure 19, having pairs of ears 39 at one end for engaging opposite sides of the said triangular plate at one angle thereof, and spaced ears 40 at its opposite end for engaging the closer spaced ears 39 of an adjacent identical hinge. Removable pins 41 extend through the assembled ears 39 and 40, and through the plate 30. By removing certain of the pins 41, and the balance actuator 20 the rotor assemblies 3, and the said booms may be positioned parallel with the fuselage when using the helicopter as a road vehicle. Other integral ears 42 extend laterally from each end of the hinge element 38, and at right angles and on the opposite side of the hinge with respect to the ears 39 and 40 for horizontally supporting the lateral ends 43 of outwardly extending blade supporting shafts 44. The referred to ears 42 and the lateral ends 43 are secured in hinged relation by means of a pin 45 passing therethrough.

Rotor blades 46 are journaled on the ends of the blade supporting shafts 44, and are secured against centrifugal force by any suitable means, such as the pins 47 in the blade supporting shafts 44 and the pin receiving slots 48 near the inner ends of the blades 46.

The plane of each rotor 3 is capable of limited rotation or tilting about the rotor driving shafts 17 by means of a linear actuator 49 hingedly secured to a stub shaft 50 which, in turn, is secured to a bracket 51 mounted on the end of each boom 4.

Each referred to housing 22 at the end of each boom 4, is provided with pairs of ears 52 to pivotally engage the extending ends 53 of the linear actuators 49.

Figures 9, 10:
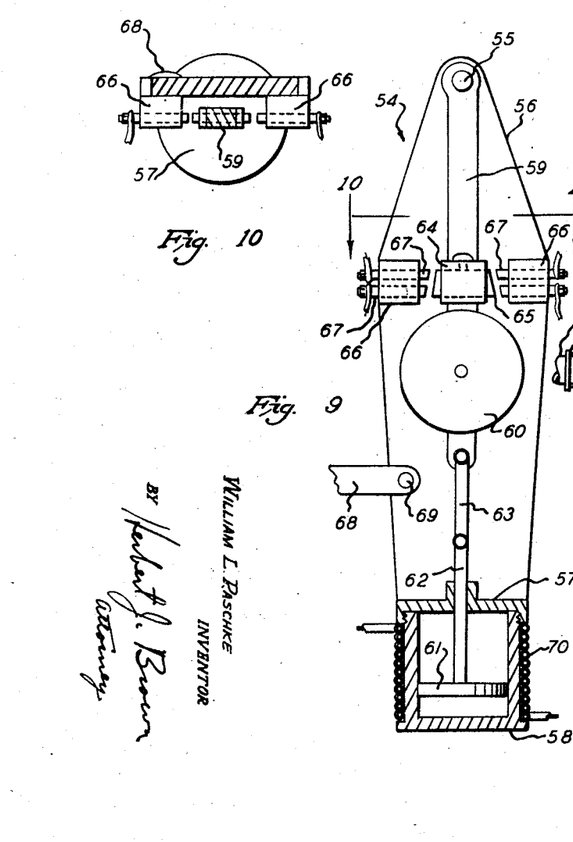
Figure 9 is an elevational and sectional view of the dampened pendulum and switch unit employed in the invention for maintaining lateral stability.
Figure 10 is a sectional view of the pendulum taken on lines 10—10 of Figure 9.

Referring now to Figures 9 and 10, a dampened pendulum switch assembly 54 is hinged for lateral movement with respect to the length of the fuselage 1 and is supported in the fuselage by means of a pin 55. The exemplary form of pendulum shown includes a depending supporting member 56 having an integral cap 57 near the lower end thereof for threadedly engaging a cylinder 58 having a closed lower end. The pendulum arm 59, which is pivoted on the supporting pin 55, is provided with a weight 60 below the said supporting pin. Within the cylinder 58 there is a piston 61 having an upwardly extending piston rod 62 which slidably passes through the diametric center of the cap 57, where it is pivotally attached to the lowermost end of the pendulum arm 59 by means of a link 63. The pendulum supporting member 56, the cap 57, and cylinder 58, are preferably of nonconducting material so as to prevent shortcircuiting of the wiring to be described.

Supported by the pendulum arm 59, and positioned above the weight 60, there is a switch support 64 which engages a switch bar 65 extending beyond either side thereof. Opposite the ends of the bar 65 there are other supports 66 of nonconducting material for engaging and supporting pairs of contacts 67. The arrangement shown is designed to close one or the other of separate circuits for inversely varying the pitch of the rotors 3, in a manner to be described.

An adjusting arm 68 may be pivotally attached, by means of a pin 69, to the depending supporting member 56 for adjusting and correcting the pendulum's zero position. The arm 68 may be adjusted by any suitable means, such as a manually operated turnbuckle (not shown) secured to the fuselage 1.

A solenoid 70 is provided around the nonconducting cylinder 58 for electrically returning the piston 61 to its zero position.

Figure 11:
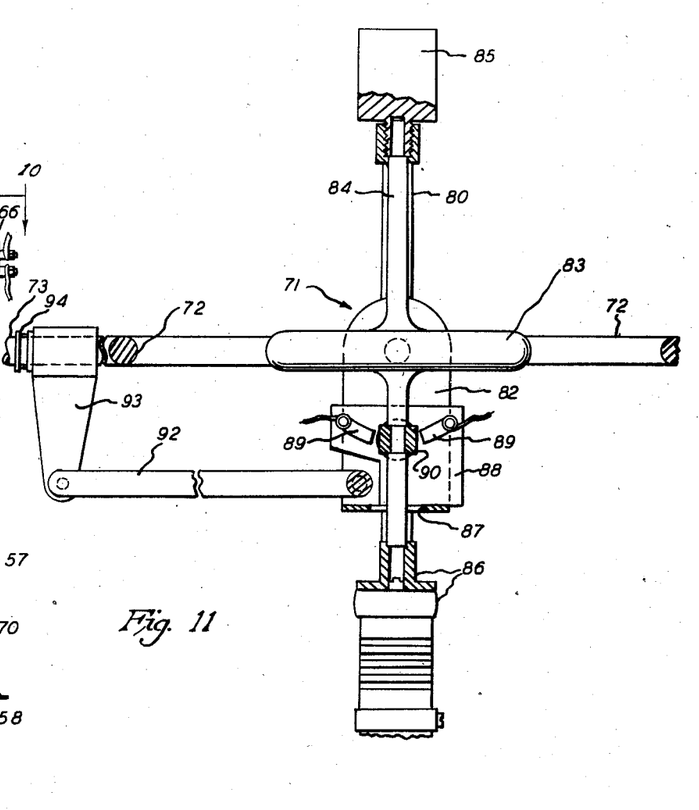
Figure 11 is an elevational view, shown in partial section, of the gyroscope and associated mechanism for maintaining longitudinal balance, as well as manual means for controlling and varying the nose up or down position.
Figure 12:
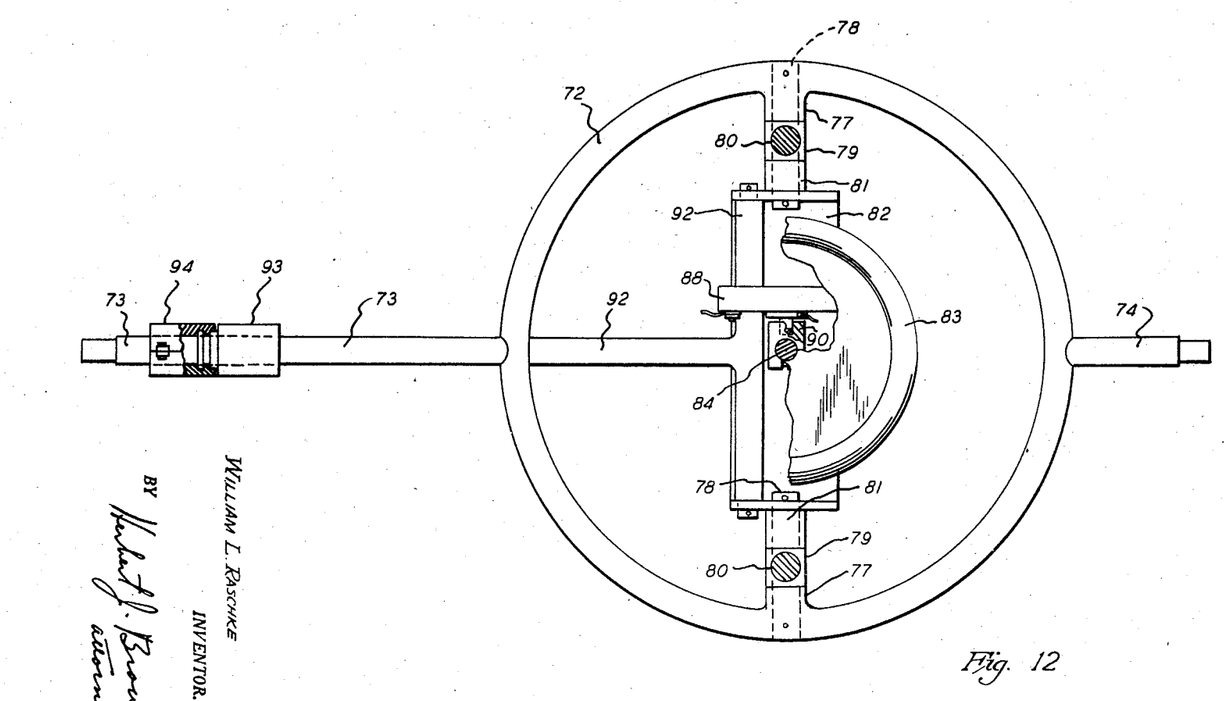
Figure 12 is a plan and broken sectional view of the form of gyroscope unit illustrated in Figure 11.
Figure 13:
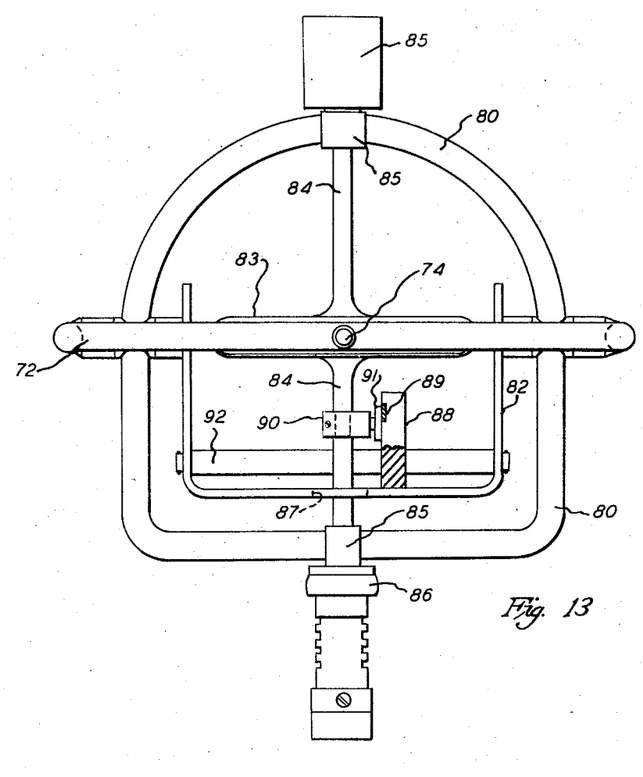
Figure 13 is an end view of the gyroscope unit shown in Figures 11 and 12.
Figure 15:
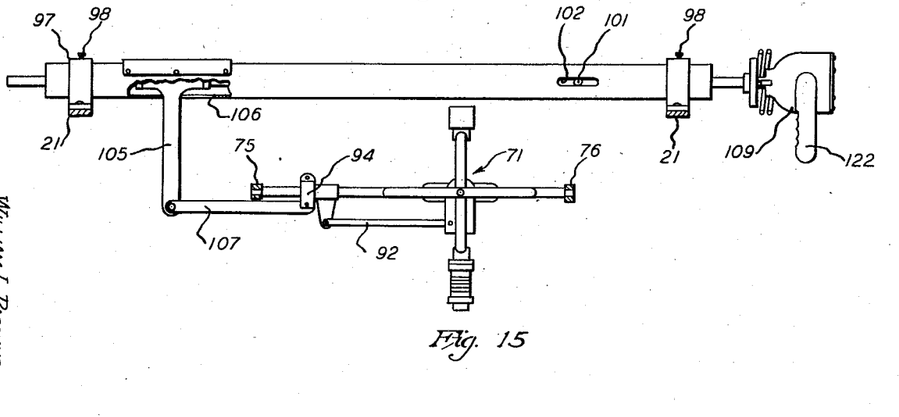
Figure 15 is a side elevational view of Figure 14.

Reference is now made to Figures 11, 12 and 13 which illustrate a gyroscope unit 71, the purpose of which is to provide automatic longitudinal balance and manual control for raising and lowering the fuselage 1 nose in flight. The gyroscope 71 includes a normally horizontal ring 72, having opposing trunnions 73 and 74 forward and aft, respectively. Both trunnions 73 and 74 are supported by bearings 75 and 76, as shown in Figure 15, mounted in the fuselage structure.

The gyroscope arrangement thus far described is positioned for relative axial rotation parallel with the fuselage 1 length. At right angles to the trunnions 73 and 74 there are inwardly projecting bearings 77 integral with the ring 72. Pins 78 extend through the bearings 77 where they respectively and rotatably support the bearings 79 of a normally vertical ring 80, and the bearings 81 of a depending C shaped cradle 82. It will be noted that the lower portion of the vertical ring 80 is enlarged to accommodate the cradle 82.

A gyroscope 83 is mounted upon a vertically disposed shaft 84, the ends of which shaft are journaled in bearings 85 in the vertically disposed ring 80. A high speed electric motor 86 is connected with the lower end of the vertical shaft 84 and is supported by the lower shaft bearing 85. It will be noted that a relatively large opening 87 is provided in the bottom of the cradle 82 to accommodate the gyroscope shaft 84. The upper bearing 85 is enlarged to counter-balance the weight of the motor 86.

A nonconducting block 88 is mounted upon the horizontal portion of the cradle 82 and to the side of the shaft 84 where it supports spaced arcuate electrical contacts 89. Opposite the contacts 89 and supported by a nonconductor block 90 journaled in a recessed portion of the shaft 84 there is a relatively broad spring actuated contact button 91 for slidably engaging either of the said contacts 89. As will be seen in the description of operation, the separate contacts 89 are for shifting the booms forward and aft to maintain longitudinal stability or balance. When the nose of the fuselage 1 is to be maintained in a position other than horizontal, the cradle 82 may be moved forward or aft by means of a pivotally connected T shaped arm 92. The latter, in turn, is pivoted to a slide 93 mounted on the forward gyroscope trunnion 73. The slide 93 is provided with an annular integral flange 94 which is engaged by a swivel connection 95 for linkage with a steering column assembly, shown in Figures 14 and 15.

Figure 14:
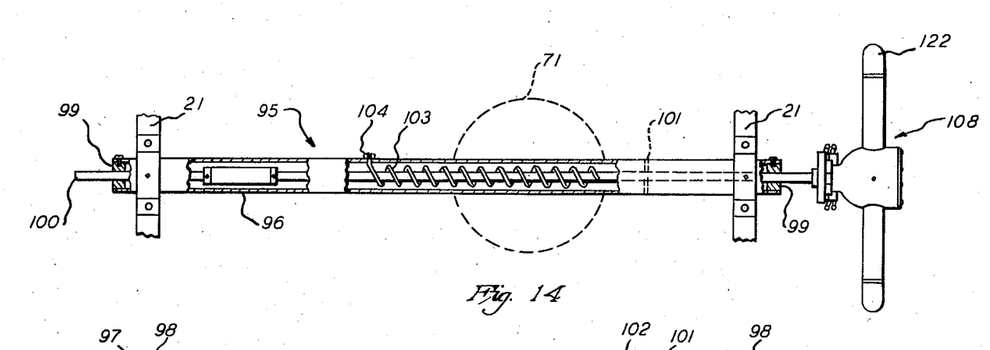
Figure 14 is a plan view, partially shown in broken section, of a control column employed in the described form of the invention.

The steering column 95 includes a tubular housing 96 secured to the fuselage structure 21 by means of brackets 97 having set screws 98 therein for securing the said tubular members in place. Bearings 99 in each end of the housing 96 slidably engage a steering rod 100 through their diametric centers. The rod 100 is secured against rotation by means of a lateral pin 101 positioned therethrough and engaging longitudinal slots in opposing sides of the housing 96. The rod 100 is normally maintained in its neutral position by a helical spring 103 positioned therearound. One end of the spring 103 is engaged in the rod 100, whereas the other end extends through the wall of the housing 96 where it is secured by a nut 104.

Within the housing 96, and journaled on the rod 100, there is a depending arm 105 which extends outwardly and below the said housing through a slot 106 formed in the latter. The arm 105 is connected by a link 107 to the previously referred to swivel 94. It is by means of the latter that the cradle 82 of the gyroscope 74 is manually positioned for assuming attitudes other than horizontal.

Figure 16:
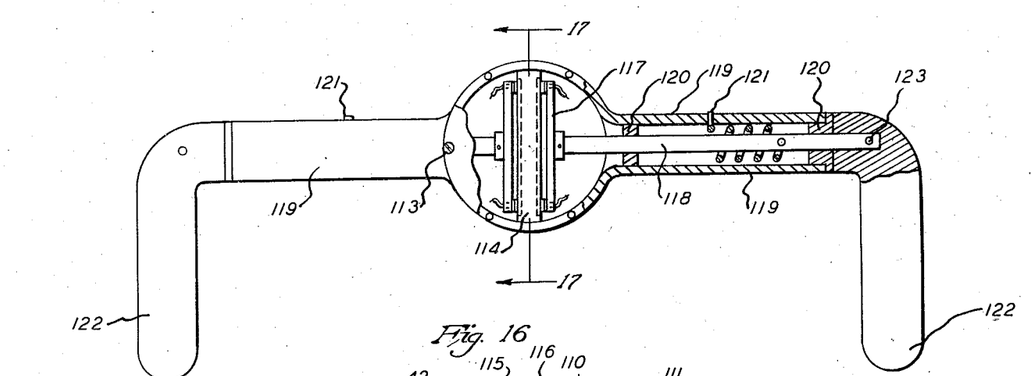
Figure 16 is an elevational and broken sectional view of the control arms and handles which form a part of the control mechanism shown in Figures 14 and 15.

At one end of the rod 100 there is a steering wheel assembly 108, the particulars of which are shown in Figures 16, 17 and 18. The steering wheel assembly 108 includes a bell shaped housing 109 rotatably mounted on the rod 100 and secured thereon by means of a nut 110 within the said housing and threaded on the said rod. A coil spring 111 is secured to the end of the bell shaped housing 109 and to the rod 100 for normally maintaining the neutral position of the steering wheel 108. As shown in the drawings, the end of the bell housing 109 may be covered with a plate 112 and secured in place by screws 113.

Longitudinally positioned with respect to the control rod 100, there is a nonconductor disk 114 within the bell housing 109 having pairs of rheostats 115 on each face thereof. As particularly shown in Figure 17, the rheostats, by reason of breaks at their centers, form switches for spring actuated contacts 116 which are laterally mounted on transverse arms 117 which, in turn, are secured to the inner ends of handle actuated rods 118. As shown in Figure 16, the bell housing 109 is provided with lateral and opposingly tubular arms 119 in which the last referred to rods 118 are rotatably positioned. Bearings 120 are positioned in the tubular arms 119 for rotatably supporting the rod 118. Helical springs 121 are positioned around the rods 118 and each having an end secured to its associated rod and another end passing through its tubular arm 119.

Depending handles 122 are secured to the outer ends of the rods 118 and are secured by means of pins 123 passing therethrough.

Another set of rheostats 124 are positioned in the face of a nonconductor disk 125 secured to the first referred to steering rod 100; as particularly shown in Figure 17. Spring actuated contacts 126 are mounted on lateral arms 127 secured to the hub of the housing 109 for slidably contacting the said rheostats. The rheostats 124 are similar to the previously referred to rheostats 115 in that they have divisions therebetween so as to break contact in neutral position, and thus function as switches.

Figure 1:
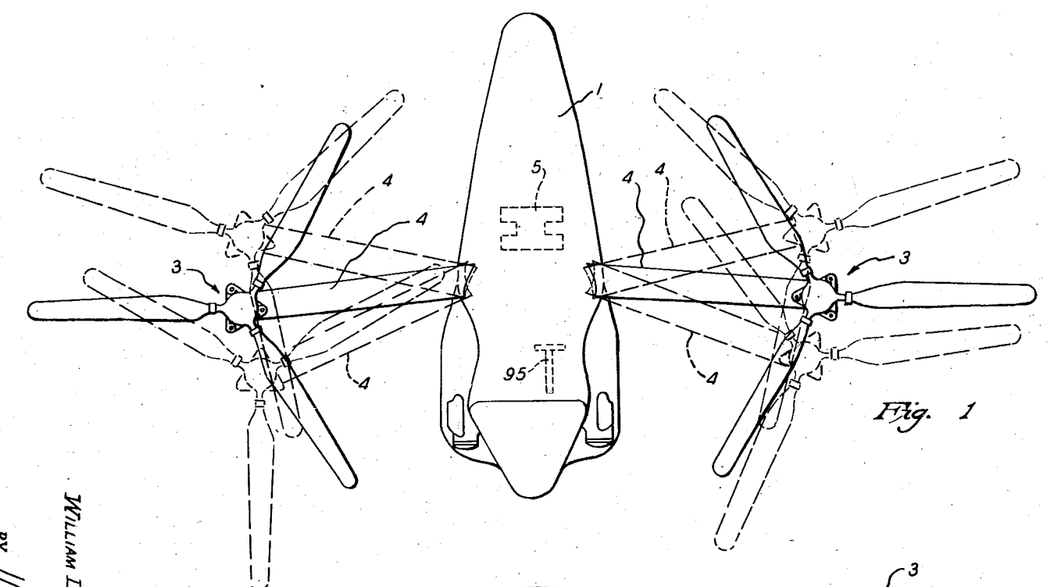
Figure 1 is a plan view of a twin rotor helicopter embodying the present invention, and showing the forward and aft hinged movement of the rotor supporting booms in dotted lines.
Figure 2:
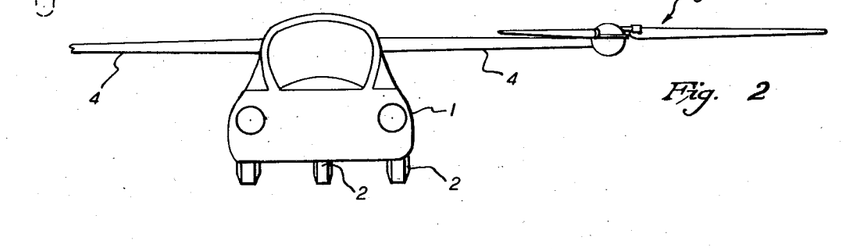
Figure 2 is a front elevational view of the helicopter shown in Figure 1.
Figures 3, 4:
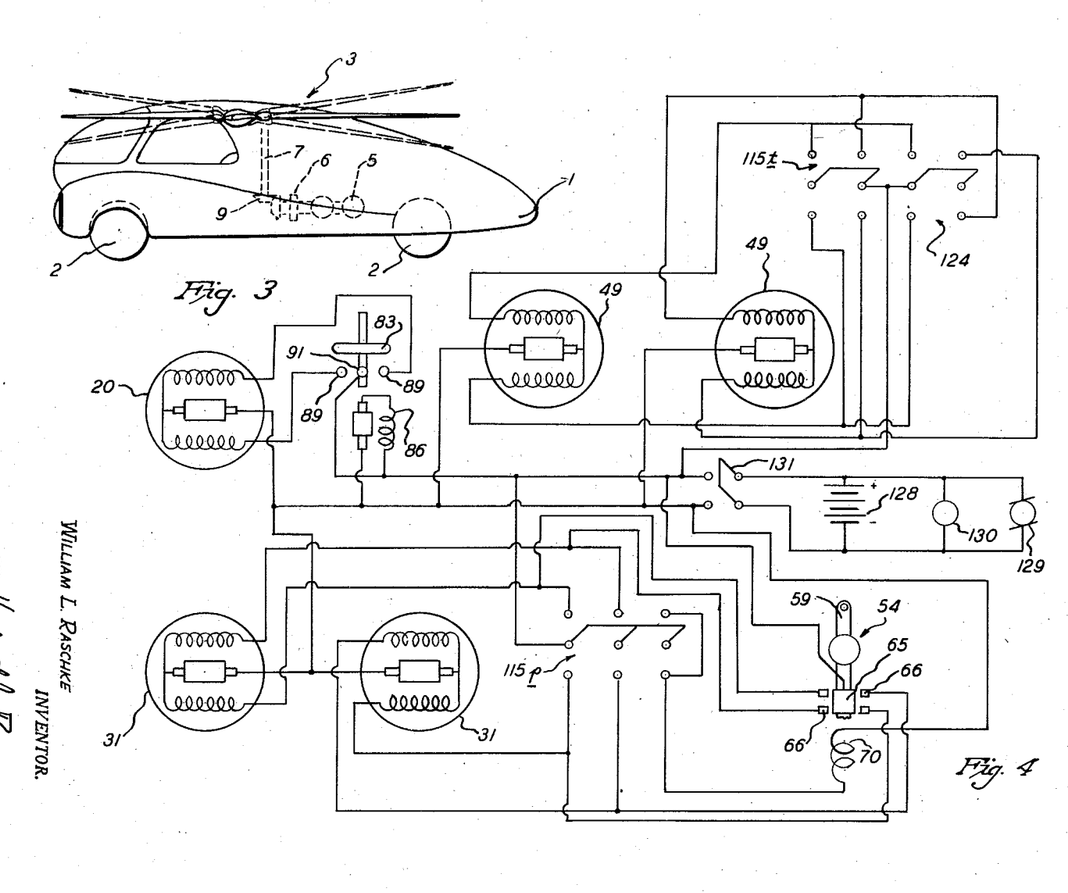
Figure 3 is a side elevational view of the helicopter shown in Figure 1 and illustrating, by means of dotted lines, the tilted positions of the rotor blades as required during the control and flight of the helicopter.
Figure 4 is a wiring diagram of the electrically operated control system.

Reference is now made to Figure 4 wherein the wiring diagram of the parts heretofore described is illustrated. A source of direct current, such as a battery 128 is provided for supplying the linear actuators 20, 31 and 49, as well as the solenoid 70 and gyroscope motor 86. A generator 129 is connected in parallel with the battery 128, and which generator is directly driven by the engine 5.

A voltage regulator 129 may be connected in parallel with the battery 128. After passing through a master switch 131, the positive terminal of the battery 128 is connected with the fields of the various actuators 20, 31 and 49, as well as with the central contacts 91 and 65 of the gyroscope and pendulum, respectively. The negative terminal of the battery 128 is connected with the armatures of the actuators 20, 31, and 49.

In carrying out the above, the source of power 128 is connected with the master pitch control switch 115p, the master tilt control switch 115t, and with the inverse tilt switch 124. It will be noted in the latter that the connections are made with alternate fields of the linear actuators 49 so as to inversely tilt the planes of the rotors 3. Similarly, the contacts 66 of the pendulum 54 are connected with alternate fields of the pitch actuators 31 for inversely and automatically varying the pitch of the rotor blades 46.

Preferably, the R. P. M. of the engine 5 is maintained at a constant speed by any suitable means (not shown) such as a governor or electronic regulator, to maintain a constant delivered power at the rotors 3. To ascend vertically, the driven rotors 3 are maintained in a substantially horizontal plane. By tilting the rotors 3 forward, a horizontal component of lift is created which not only maintains the helicopter in the air but also provides thrust for forward speed.

To turn either left or right, the steering wheel 108 is turned in a corresponding direction, thus closing the switches 115t, which, in turn, tilts the rotors 3, thus tending to rotate the fuselage 1 about its vertical axis. The pitch of the rotors may be simultaneously increased or decreased by partially rotating one of the handles 122, thus closing the pitch control switch 115p within the bell housing 109. The reference numerals 115t and 115p represent the separate sides of the previously referred to rheostats and switch arrangement 115. Similarly, the rotors 3 may be simultaneously tilted forward or aft by rotating the other handle 122 and closing the associated switch 115t.

By pushing the steering wheel 108 forward, the cradle 82 of the gyroscope 71 is correspondingly moved to close one of the contacts 89 which connects with the balance actuator 20, to move the booms 4 aft. The last referred to operation has the effect of moving the center of lift rearwardly, thus causing the nose of the fuselage 1, as well as the planes of the rotors 3, to assume a downwardly, inclined position. Conversely when pulling the steering wheel 108 toward the operator the contacts are reversed, causing the balance actuator to move in the opposite direction, and move the booms 4 forward. With the center of lift in the forward position the nose and other parts of the craft are correspondingly raised.

Since the axis of the gyroscope 83 remains in a vertical position, the selected neutral position of the cradle supported contacts 89 are normally open. Any shift in the center of gravity tending to vary the selected longitudinal attitude of the helicopter is corrected by the relative movement of the gyroscope contacts 91, and 89, thus closing the circuit required to move the booms 4 in the direction required to make the correction.

Similarly, lateral stability is maintained by the pendulum 54. Should the craft tend to bank, the contacts 65 of the pendulum 54 closes corresponding contacts 67 to inversely vary the pitch of the rotors 3, thus returning the lateral shift of the craft to its horizontal position.

By reason of the described rheostats 115 and 124, and the described springs 103, 111 and 121, together with the described arrangement of controls, the controls of a conventional aircraft are simulated to impart both "feel" and corresponding reaction to the helicopter.

What is claimed is:

1. A helicopter comprising a fuselage, laterally disposed rotor supporting elements mounted on said fuselage and arranged symmetrically with respect to the fore-and-aft axis of said fuselage, a bladed lifting rotor unit supported on each of said elements, each of said units including a hub, means for displacing in a generally fore-and-aft direction said rotor supporting elements with respect to said fuselage, means operable independently of said last-named means for tilting said hubs with relation to their associated supporting elements, and means for cyclically varying the blade pitch of said rotor units.

2. A helicopter comprising a fuselage, laterally disposed rotor supporting elements mounted on said fuselage and arranged symmetrically with respect to the fore-and-aft axis of said fuselage, a bladed lifting rotor unit supported on each of said elements, each of said units including a hub, means for displacing in a generally fore-and-aft direction said rotor supporting elements with respect to said fuselage, means operably independently of said last-named means for inversely tilting said hubs with relation to their associated supporting elements, and means for cyclically varying the blade pitch of said rotor units.

3. A helicopter comprising a fuselage, laterally disposed rotor supporting elements mounted on said fuselage and arranged symmetrically with respect to the fore-and-aft axis of said fuselage, a bladed lifting rotor unit supported on each of said elements, each of said units including a hub, means for displacing in a generally fore-and-aft direction said rotor supporting elements with respect to said fuselage, means operable independently of said last-named means for tilting said hubs with relation to their associated supporting elements, and means for cyclically and inversely varying the blade pitch of said rotor units.

4. A helicopter comprising a fuselage, laterally disposed rotor supporting elements mounted on said fuselage and arranged symmetrically with respect to the fore-and-aft axis of said fuselage, a bladed lifting rotor unit supported on each of said elements, each of said units including a hub, means for displacing in a generally fore-and-aft direction said rotor supporting elements with respect to said fuselage, means operable independently of said last-named means and mounted on said rotor supporting elements for tilting said hubs with relation to said fore-and-aft axis of said fuselage, and means for cyclically varying the blade pitch of said rotor units.

5. A helicopter comprising a fuselage, laterally disposed rotor supporting elements mounted on said fuselage and arranged symmetrically with respect to the fore-and-aft axis of said fuselage, a bladed lifting rotor unit supported on each of said elements, each of said units including a hub, means for displacing in a generally fore-and-aft direction said rotor supporting elements with respect to said fuselage, means operably independently of said last-named means for inversely tilting said hubs with relation to their associated supporting elements, and means carried by said hubs for cyclically and selectively varying the blade pitch of said rotor units.

WILLIAM L. RASCHKE.

REFERENCES CITED

The following references are of record in the file of this patent:

UNITED STATES PATENTS

| Number | Name | Date |
|---|---|---|
| 2,375,592 | Smith | May 8, 1945 |
| 2,023,105 | Smith | Dec. 3, 1935 |
| 2,321,572 | Campbell | June 15, 1943 |
| 2,270,875 | Hanson et al. | Jan. 27, 1942 |